US005592441A

United States Patent [19]

Kuhn

[11] Patent Number: 5,592,441

[45] Date of Patent: *Jan. 7, 1997

[54] HIGH-GAIN DIRECTIONAL TRANSDUCER ARRAY

[75] Inventor: Philip M. Kuhn, Severna Park, Md.

[73] Assignee: Martin Marietta Corporation, Syracuse, N.Y.

[ * ] Notice: The term of this patent shall not extend beyond the expiration date of Pat. No. 5,377,166.

[21] Appl. No.: 542,477

[22] Filed: Oct. 6, 1995

[51] Int. Cl.[6] .......... G01S 15/00

[52] U.S. Cl. .......... 367/153; 367/138

[58] Field of Search .......... 310/337; 367/153, 367/137, 135, 138

[56] References Cited

U.S. PATENT DOCUMENTS

| | | | |
|---|---|---|---|
| 3,593,818 | 7/1971 | Pohlmann | 73/647 |
| 4,673,057 | 6/1987 | Glassco | 181/144 |
| 5,239,518 | 8/1993 | Kazmar | 367/157 |
| 5,377,166 | 12/1994 | Kuhn | 367/138 |
| 5,500,493 | 3/1996 | Guigne et al. | 367/191 |

*Primary Examiner*—Ian J. Lobo
*Attorney, Agent, or Firm*—W. H. Meise; P. J. Checkovich; S. A. Young

[57] ABSTRACT

A transducer array according to the invention includes forty-two acoustic transducers for use in a fluid medium, with each of the transducers having maximum lateral dimensions of less than one acoustic wavelength in the medium, whereby the transducers themselves tend to radiate isotropically. The elements of the array are located at the vertices of an regular geodesic two-frequency icosahedron. The transducer array also includes a driver or a receiver, or both, and arrangements for coupling them to the array elements. A switching circuit can couple the array elements alternately to the driver or receiver, depending upon the operating mode. A conventional delay controller is coupled to the acoustic transducers, for controlling an acoustic beam formed by the array. In a particular embodiment of the invention, the array is operated at frequencies selected so that the inter-transducer spacing of any two mutually adjacent transducers does not exceed $2\lambda/3$, and is not less than $\lambda/3$.

2 Claims, 8 Drawing Sheets

HIGH-GAIN DIRECTIONAL TRANSDUCER ARRAY

FIELD OF THE INVENTION

This invention relates to transducer arrays, and more particularly to regular geodesic two-frequency icosahedral arrays of transducers such as acoustic transducers, such as may be used for sonar and underwater detection, location or monitoring.

BACKGROUND OF THE INVENTION

Acoustic transducers or transponders are used for transducing acoustic (sound) energy with electrical energy. This may be useful, for example, for producing sound in response to electrical signals, as in a loudspeaker, or for producing electrical signals in response to sound energy, as in a microphone. In this context, the term sound also means ultrasound. The design of an acoustic transducer is strongly impacted by the fluid medium for which it is intended, and whether it is intended for producing sound energy in the medium, or extracting energy therefrom. When electrical energy is applied to the acoustic transducer for coupling to the fluid medium, the transducer must be strongly coupled to the fluid, otherwise the electrical energy will not be transferred to the fluid (will be reflected to or remain in the electrical source), or will be absorbed in the transducer itself, thereby causing heating. Strong coupling to the medium generally means a relatively large aperture, so that significant amounts of the fluid may be moved in response to the input electrical energy, and the structure must be sufficiently large to handle the heat energy and forces involved in the transduction. Acoustic transducers intended for sensing or picking up sounds, on the other hand, may be small, as they are unlikely to absorb so much energy from the medium that they heat up, and the relatively small electrical signals which are produced can generally be amplified to useful levels. A further advantage of physically small transducers is that they tend to have relatively good frequency response, by comparison with larger transducers, because their mechanical resonances occur at higher frequencies than those of larger transducers, and they therefore have a broader frequency range over which the amplitude response of the transducer is flat.

Transducers for underwater purposes such as sonar are often operated in both a transmission mode, and, at a different time, in a reception mode. The requirements of the transmission mode tend to dominate the design of such transducers. U.S. Pat. No. 5,239,518, issued Aug. 24, 1993 in the name of Kazmar, describes one such sonar transducer, therein termed a "projector." The Kazmar transducer includes an electrostrictive or piezoelectric material, which responds to electrical signals to produce corresponding acoustic signals, and which also transduces in the other direction, producing electrical signals in response to acoustic energy.

The velocity of sound signals depends upon the density of the medium; the velocity of sound in air is about 1100 ft/sec., in water about 4800 ft/sec., and in steel about 16000 ft/sec. Since the wavelength in a medium at a given frequency is directly related to the velocity of propagation, the wavelength in water at any given frequency is much larger than in air. Consequently, a given structure is smaller, in terms of wavelengths, in water than in air. Therefore, structures such as acoustic transducers tend to be relatively small in terms of wavelength when immersed in their fluid medium, water. A concomitant of small size in terms of wavelength is isotropy or nondirectionality of the response; a transducer which is very small in terms of wavelengths effectively appears to be a point source, and transduces in a nondirectional or omnidirectional manner.

Directional transduction is desirable for many reasons. For example, when using a transducer to listen to distant sound sources, a directional "beam" tends to reduce the influence of noise originating from other directions. When transmitting acoustic energy toward the location of an object to be detected by observation of the acoustic reflection, a directional transmission "beam" concentrates the available energy toward the object, making it more likely that sufficient energy strikes the object that its reflection can be detected. However, as mentioned, an acoustic transducer tends to be small in terms of wavelength, and to provide omnidirectional transduction.

A well-known method for increasing acoustic directionality is to arrange a plurality of individual transducers in an array. For example, long "line" arrays of acoustic transducers may be spaced along a cable, and towed behind a ship performing undersea examination. The acoustic transducers are energized simultaneously in a transmit mode, so that they act in concert, with the result that the effective dimension of the transmitting transducer is established by the length of the cable, rather than the dimension of an individual transducer. This enables a directional beam to be produced, which in the case of the described towed array is a "fan" beam orthogonal to the cable's length. The same towed array, operated as a receive transducer, combines all of the received signals without relative delays or phase shifts, and achieves a "receive beam" corresponding to the abovementioned fan beam.

Other types of arrays are known. An April, 1987 report prepared for Naval Underwater Systems Center, New London, Conn., under contract NICRAD-85-NUSC-022 describes an array of twenty-one transducers in the form of a right circular cylinder, which is advantageous because of its symmetry in the horizontal plane, and the resulting 360-degree azimuth coverage. The diameter and height of the described cylindrical array are about one wavelength. The elements were driven with relative time delays for phasing to a plane.

An arrangement of transducers on the surface of a sphere is described in U.S. Pat. No. 5,377,166, issued Dec. 27, 1994 in the name of Kuhn. This arrangement has the advantage that a directional beam can be pointed generally in any direction in three-dimensional space; in one embodiment it includes twelve transducers located at the vertices of an icosahedron, and in another embodiment it includes twenty transducers located at the vertices of a dodecahedron. These regular polyhedrons have the advantage that each transducer is equidistant from its adjacent transducer, and the mutual coupling effects on the transducers are the same, so their "radiation" impedance is the same from transducer to transducer. In one embodiment of the arrangement described in the abovementioned Kuhn patent, the icosahedral array is concentric with the dodecahedral array. The element-to-element spacing of the transducers in both arrays is selected to lie between $\lambda/3$ and $2\lambda/3$, to prevent unwanted peaks in the array response.

Each of the transducers of the Kuhn patent has a maximum dimension of less than one acoustic wavelength in the medium, as a result of which the transducers tend to be isotropic, meaning that each one radiates equally well in all directions, with the further result that the directivity or directional gain of the array is entirely due to the array factor and the overall dimensions of the array, rather than to the characteristics of the transducers themselves. The minimum beamwidths achieved by Kuhn are described in the '166 patent as being about 30°. While the Kuhn arrangement is satisfactory, there may be cases in which it is desired to have narrower or more selective beams, in which case greater directive gain must be achieved, which in turn requires a larger array aperture. The maximum gain of a Kuhn arrangement is determined, in part, by its effective aperture, which may be estimated by considering that the inter-element spacing along the surface of the sphere is a maximum of about 2λ/3, which makes the maximum diameter of the dodecahedral sphere about two wavelengths, and the maximum diameter of the icosahedral array is smaller. Thus, to achieve more selective beams, more directional gain must be provided than that which can be achieved by the dodecahedral arrangement of the '166 patent. The larger aperture requires a larger "diameter" of the sphere of transducers. The dodecahedron, however, is the largest of the classical regular polyhedrons. Consequently, some structure other than a dodecahedron must be used to define the array. Improved array configurations are desirable.

SUMMARY OF THE INVENTION

A transducer array according to the invention, for use in a fluid medium, includes forty-two acoustic transducers. Each of the transducers has maximum lateral or transverse dimensions in the fluid medium of less than one acoustic wavelength. An arraying arrangement locates the acoustic centers of acoustic transducers at the vertices of an regular geodesic two-frequency icosahedron (RGTFI). The arraying arrangement further includes either a driver or a receiver, or both, which is or are coupled to the transducers, for generating transducer drive signals therefor, or for receiving transduced signals therefrom, respectively. In order to direct the acoustic beam or beams, a delay control arrangement is coupled to the acoustic transducers and with the current one of the driver or receiver, for controlling the phase shifts or delays. When the transducers are placed at the vertices of an regular geodesic two-frequency icosahedron, the spacing between elements on the surface of the corresponding sphere takes on one of two spacings, one of which is 1.1308 times the other. This difference in spacing tends to increase the bandwidth, and somewhat affects the mutual coupling, but so long as the operating frequency is maintained such that the maximum spacing between adjacent transducers is no greater than 2λ/3, and the minimum spacing is no less than λ/3, the system will operate in a manner similar to that of the icosahedron or dodecahedron, but with narrower or more selective beams. The transmitter, receiver and controller are operated at frequencies such that the maximum spacing between adjacent transducers does not exceed 2λ/3, and the minimum spacing is no less than λ/3.

DESCRIPTION OF THE INVENTION

Figure 1A:
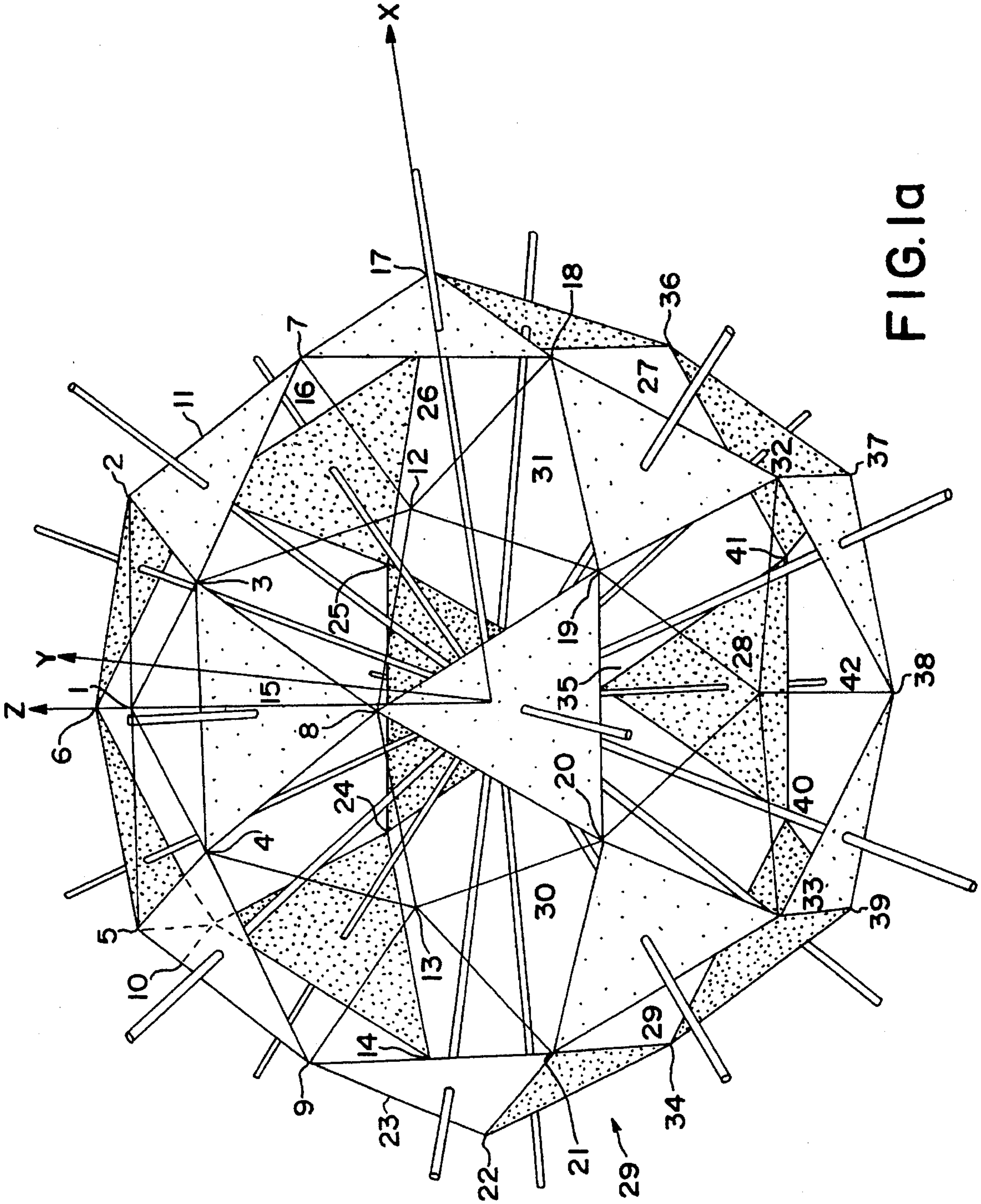
FIGS. 1*a* and 1*b* represent two sides of an regular geodesic two-frequency icosahedral polyhedron, the vertices of which represent the locations of the transducers of an acoustic array according to the invention.
Figure 1B:
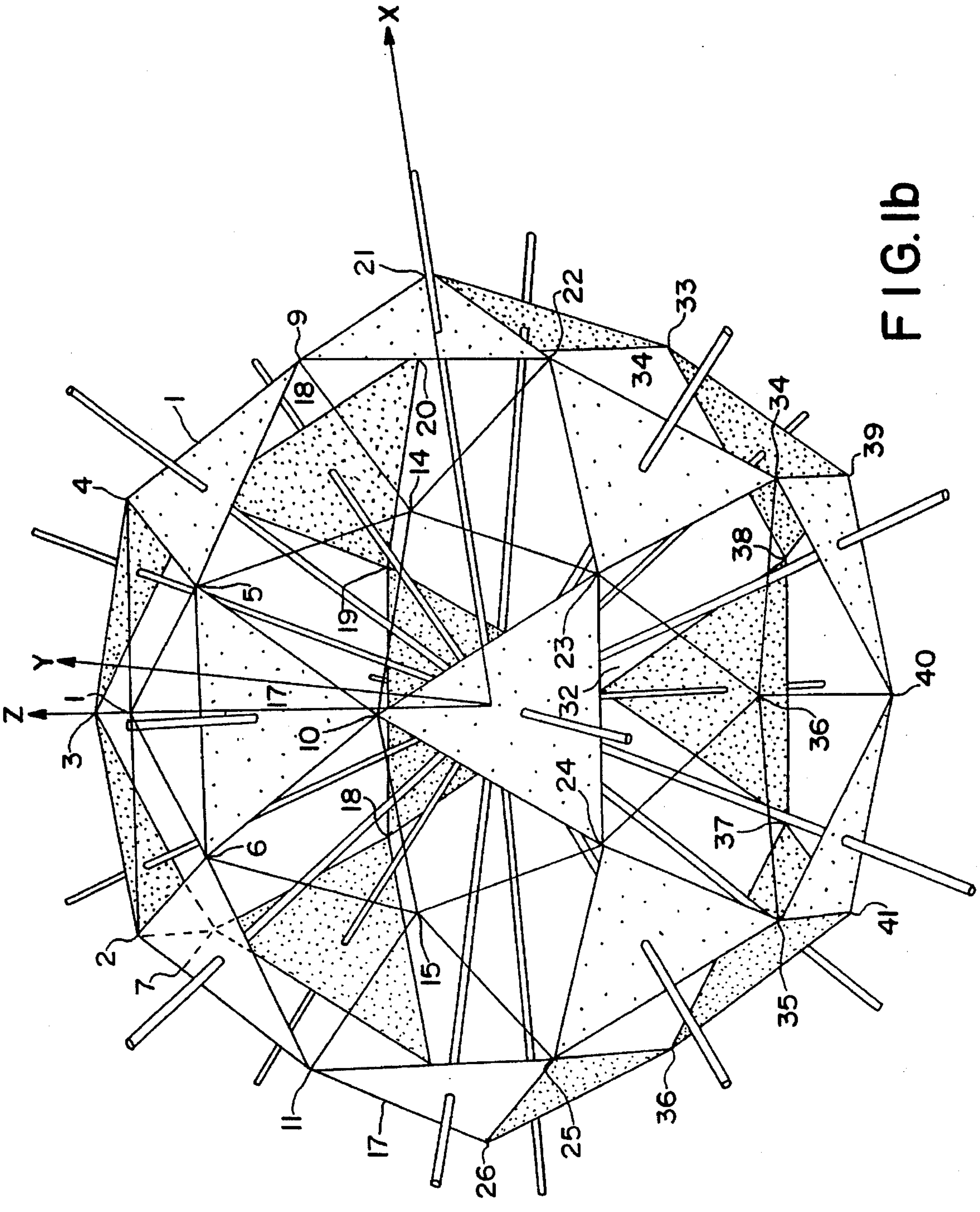

FIGS. 1*a* and 1*b* are views of an regular geodesic two-frequency icosahedron 100, as defined by R. Buckminster Fuller in the text "Synergetics" published by Macmillan Publishing Co., Inc., Third printing, 1978, ISBN 0-02-541870-X, Q295.F84 191 74-7264, in which the "two-frequency" aspect relates to the different face or facet configurations, or separations between adjacent vertices. Regular geodesic two-frequency icosahedron (RGTFI) 100 of FIGS. 1*a* and 1*b* has forty-two vertices designated 1, 2, 3, . . . , 42, each of which defines the location of a transducer of a set of forty-two mutually identical acoustic transducers in accordance with the invention. Since the transducers are co-located with the vertices, the vertices 1–42 may also be termed "transducers". The acoustic transducers thus form a spherical array, which has regular spacing between mutually adjacent elements of the array, but which spacing takes on two values, namely 1.000 and about 1.1308. Such a spherical array is capable of forming a "searchlight" or "pencil" beam, as known to those skilled in the art, when the signal transduced by the transducers is properly delayed or phased, and combined. It should be noted that a directional "beam" may be formed in both a transmitting and a receiving mode, with the delay characteristics required to form a particular beam being the same in both transmission and reception. Also, such characteristics of the array as the impedance of the transducers will tend to be the same in transmission and reception, with the only exception being in the case in which the transmitting-mode drive is great enough to cause nonlinear results such as cavitation. Because each of the elements of the array is in a regular relationship with the adjacent elements, the mutual coupling between elements tends to take on only two values when the beam is not steered, and as a consequence, the array operates in a manner which is similar to a spherical array with unitary interelement spacing. Another advantage of an array with a larger number of transducers is that a more powerful beam can be generated when the array is operated as a source. The amount of the increase in source amplitude may be expressed as $10\log_{10}(N)$, where N is the normalized number of transducers, assuming that each transducer produces or transduces the same amount of power.

In FIGS. 1*a* and 1*b*, regular geodesic two-frequency icosahedron 100 exhibits eighty triangular facets, each of which is defined by the numbered points at their vertices. The vertices are illustrated in their relationship with mutually orthogonal X, Y, and Z axes. For example, a point or node 1 lies on the Z axis, and is surrounded by a plurality of points 2, 3, 4, 5, and 6, which, together, define five isosceles facets or triangles {1,2,3}, {1,3,4}, {1,4,5}, {1,5,6}, and {1,2,6}. These designations may also be written as "1,2,3; 1,3,4; 1,4,5; 1,5,6; and 1,2,6" respectively. Certain triangles are shaded in FIGS. 1 and 2, so that the three-dimensional relationships will be more readily understood.

Each isosceles triangle of the sets {1,2,3}, {1,3,4}, {1,4,5}, {1,5,6}, and {1,2,6} has a base which defines one side of an equilateral triangle. For example, the base or side 2,3 of triangle {1,2,3} is identical to or contiguous with the upper side of a further triangle {2,3,7}, side 3,4 of triangle {1,3,4} is the upper side of a triangle {3,4,8}, side 4,5 of triangle {1,4,5} is the upper side of a triangle {4,5,9}, side

5,6 of triangle {1,5,6} is contiguous with an upper side of triangle {5,6,10}, and side 6,2 of triangle {1,2,6} is contiguous with the upper side of a triangle {2,6,11}. Triangles {2,3,7}, {3,4,8}, {4,5,9}, {5,6,10}, and {2,6,11}, which are shaded in FIGS. 1*a* and 1*b*, are equilateral (60°) triangles. The differences between the relative lengths of the sides of the 60° equilateral triangles and the ~55.57°, ~68.86° isoceles triangles with the same base dimension defines a difference of lengths in the ratio 1.130826361. As mentioned above, the structure is regular, and as a consequence the mutual coupling takes on moderate and even values from element to element of the array, which therefore provides predictable performance.

The locations of vertices 1–42 of FIGS. 1*a* and 1*b*, in terms of X, Y, and Z coordinates, are tabulated in TABLE 1 below, for the particular orientation of the array in the coordinate system which is illustrated in FIGS. 1*a* and 1*b*.

TABLE I

CARTESIAN COORDINATES OF VERTICES
OF AN Regular geodesic two-frequency icosahedron

| ELEMENT # | X | Y | Z |
|---|---|---|---|
| 1 | 0 | 0 | R |
| 2 | p | 0 | z |
| 3 | p cos 72° | p sin 72° | z |
| 4 | p cos 144° | p sin 144° | z |
| 5 | p cos 216° | p sin 216° | z |
| 6 | p cos 288° | p sin 288° | z |
| 7 | S cos 18° | S sin 18° | t |
| 8 | S cos 90° | S sin 90° | t |
| 9 | S cos 162° | S sin 162° | t |
| 10 | S cos 234° | S sin 234° | t |
| 11 | S cos 306° | S sin 306° | t |
| 12 | W cos 54° | W sin 54° | x |
| 13 | W cos 126° | W sin 126° | x |
| 14 | W cos 198° | W sin 198° | x |
| 15 | W cos 270° | W sin 270° | x |
| 16 | W cos 342° | W sin 342° | x |
| 17 | R cos 0° | R sin 0° | 0 |
| 18 | R cos 36° | R sin 36° | 0 |
| 19 | R cos 72° | R sin 72° | 0 |
| 20 | R cos 108° | R sin 108° | 0 |
| 21 | R cos 144° | R sin 144° | 0 |
| 22 | R cos 180° | R sin 180° | 0 |
| 23 | R cos 216° | R sin 216° | 0 |
| 24 | R cos 252° | R sin 252° | 0 |
| 25 | R cos 288° | R sin 288° | 0 |
| 26 | R cos 324° | R sin 324° | 0 |
| 27 | W cos 18° | W sin 18° | −x |
| 28 | W cos 90° | W sin 90° | −x |
| 29 | W cos 162° | W sin 162° | −x |
| 30 | W cos 234° | W sin 234° | −x |
| 31 | W cos 306° | W sin 306° | −x |
| 32 | S cos 54° | S sin 54° | −t |
| 33 | S cos 126° | S sin 126° | −t |
| 34 | S cos 198° | S sin 198° | −t |
| 35 | S cos 270° | S sin 270° | −t |
| 36 | S cos 342° | S sin 342° | −t |
| 37 | p cos 36° | p sin 36° | −z |
| 38 | p cos 108° | p sin 108° | −z |
| 39 | p cos 180° | p sin 180° | −z |
| 40 | p cos 252° | p sin 252° | −z |
| 41 | p cos 324° | p sin 342° | −z |
| 42 | 0 | 0 | −R |

where $$p=\frac{R}{2\cos 18°}=\frac{d}{2\sin 36°},\ z=\frac{R}{2\sin 36°},$$

$$d=2R\sin 18°,\ S=\frac{R}{2\sin 36°}\cdot t=p=\frac{R}{2\cos 18°}=\frac{d}{2\sin 36°},$$

$$W=R\cos\left(90°-2\sin^{-1}\left(\frac{1}{2\cos 18°}\right)\right),$$

TABLE I-continued

CARTESIAN COORDINATES OF VERTICES
OF AN Regular geodesic two-frequency icosahedron

| ELEMENT # | X | Y | Z |
|---|---|---|---|

$$d=d_p\left(\frac{\sin 18°}{\sin\left(\left(\sin^{-1}\left(\frac{1}{2\cos 18°}\right)\right)/2\right)}\right),$$

$$X=R\sin\left(90°-2\sin^{-1}\left(\frac{1}{2\cos 18°}\right)\right)$$

R = spherical radius
d = sides of equilateral triangles
$d_p$ = length of the equal sides of the isosceles triangles, or "pentagonal centroidal distance".

Examination of the environment of a few of the individual transducers is indicative of the reason that the mutual coupling is well-behaved. Referring to FIG. 1*a*, the elements at locations 1, 12, 13, and 28 are at the shorter (1.000×) distance from five adjacent elements, because they are at the centers of pentagons formed by isosceles triangles. On the other hand, elements at locations on the edges of the pentagons, such as element 3, for example, are spaced from six elements, namely by unity relative distance from elements 1 and 12, and by the 1.1308× distance from elements 2, 4, 7, and 8. Thus, there are only two types of elements in the array, those surrounded by five, and those surrounded by six adjacent elements. Consequently, the mutual impedances of the array transducer elements (in the unsteered condition) have only two values, and, within the bandwidth limitations established by the limitation of the maximum frequency so that the larger inter-element spacing does not exceed about 2λ/3, and the minimum frequency is not such that the smaller inter-element spacing is not less than about λ/3.

Figure 2:
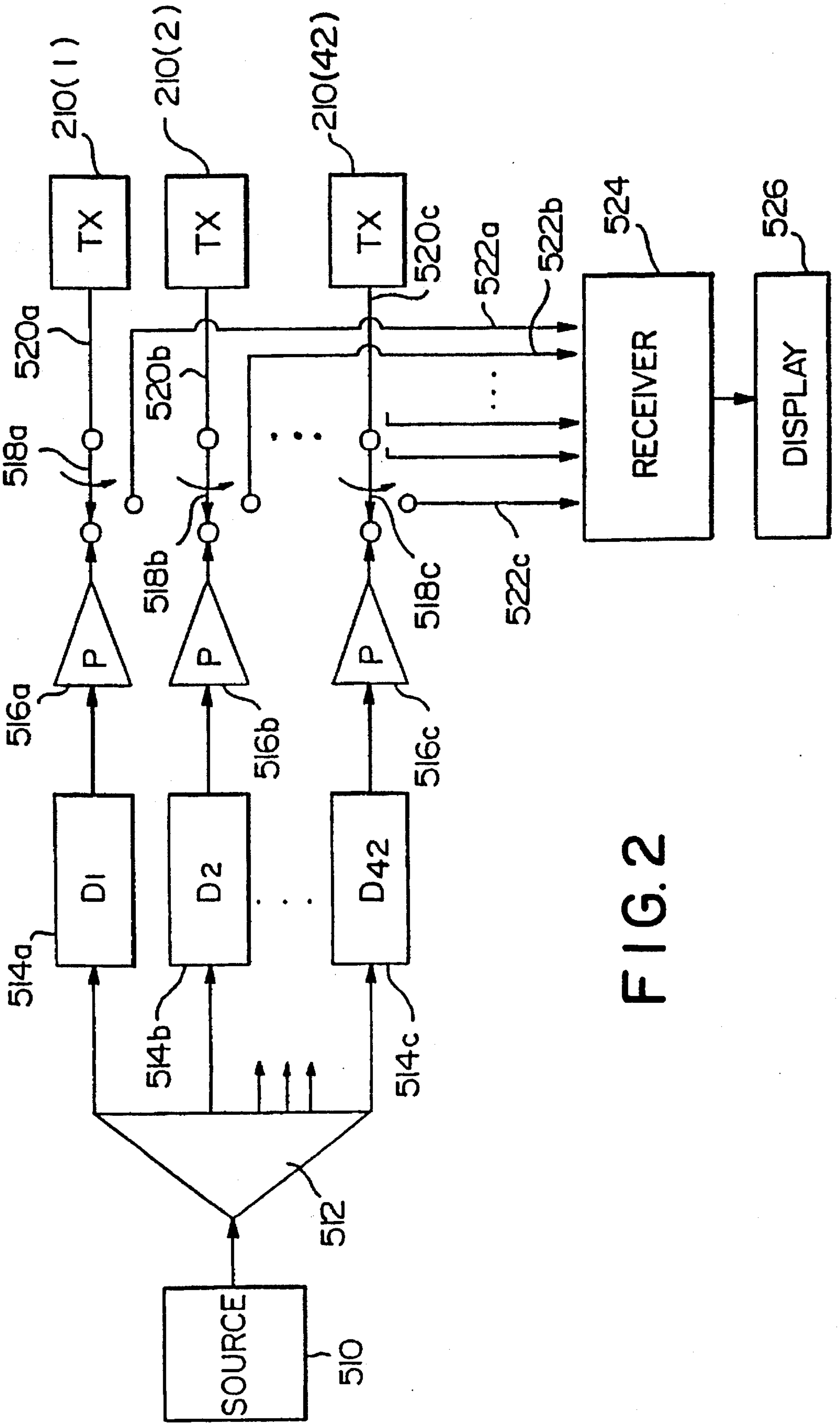
FIG. 2 is a simplified block diagram of a sonar system for the array of FIGS. 1*a* and 1*b*.

FIG. 2 is a simplified block diagram of a sonar system according to the invention, including a transmitter, a receiver, and a controller for controlling the phase shifts or delays imparted to the signals in order to provide the desired directional results. In FIG. 2, electrical energy at a particular frequency to be transmitted is applied from a source 510 to a power splitter 512, which divides the signal into forty-two equal-amplitude portions, and applies each portion to a delay element (D) 514*a*, 514*b*, . . . , 514*c*, each of which delays the signals by a particular amount, as known to those skilled in the art, so that the desired acoustic beam is ultimately formed. The mutually delayed signals at the outputs of delay elements 514*a*, 514*b*, . . . , 514*c* are applied individually to one of a set of corresponding power amplifiers (P) 516*a*, 516*b*, . . . , 516*c*, which amplify the delayed signals to a power level sufficient to drive transducers (TX) of an regular geodesic two-frequency icosahedral array, such as transducers 210(1), 210(2) . . . , 210(42). The amplified signals are applied from power amplifiers 516*a*, 516*b*, . . . , 516*c* to the electrical connections 520*a*, 520*b*, . . . , 520*c* of drive transducers (TX) 210(1), 210(2) . . . , 210(42) by way of switches 518*a*, 518*b*, . . . , 518*c*, in their illustrated positions. With the switches 518*a*, 518*b*, . . . , 518*c* in their illustrated positions, a transmitting sonar array is formed, with the beam(s) directed in a manner established by the settings of delays 514*a*, 514*b*, . . . , 514*c*.

To operate the arrangement of FIG. 2 in a receiving mode, the movable elements of switches 518*a*, 518*b*, . . . , 518*c* are thrown to their alternate positions (not illustrated), whereby each electrical connection 520*a*, 520*b*, . . . , 520*c* of transducer elements 210(1), 210(2) . . . , 210(42), respectively, is coupled by way of a conductor 522*a*, 522*b*, . . . , 522*c* to a receiver 524, which receives the low-power signals, and processes them in known manner to provide the desired information on display 526.

Figure 3A:
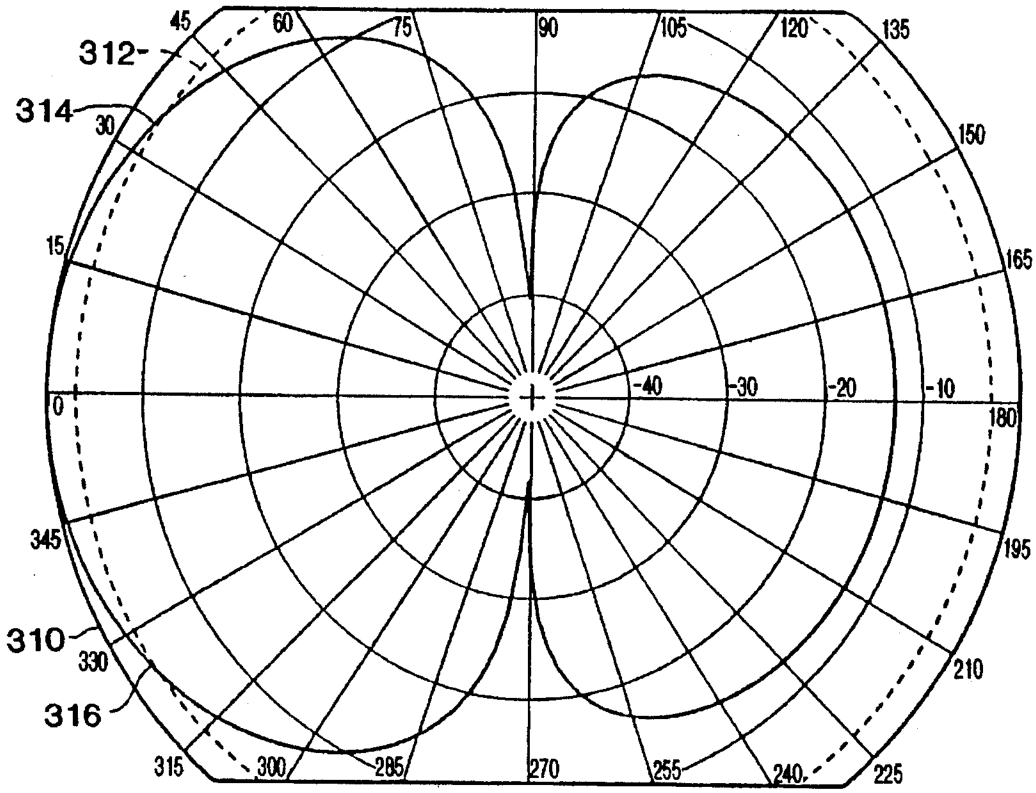
FIGS. 3*a* and 3*b* are horizontal and vertical "radiation" patterns, respectively, for an array according to the invention at 2000 Hz.
Figure 3B:
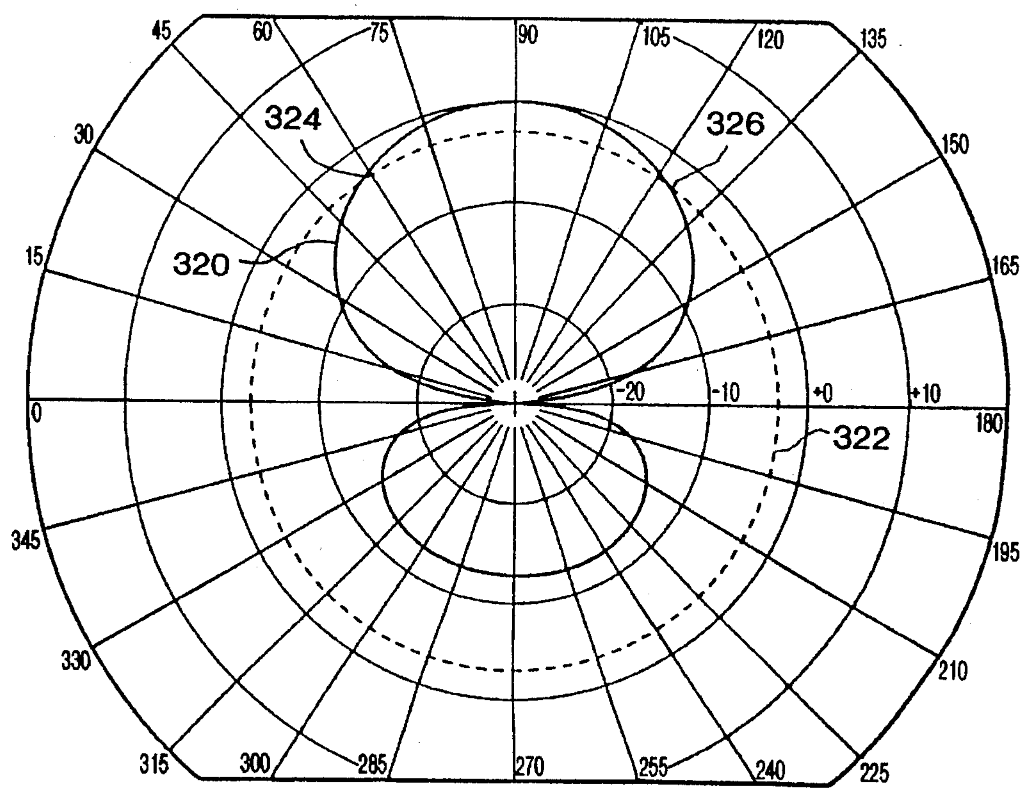

FIGS. 3*a* and 3*b* are horizontal and vertical amplitude or acoustic "radiation" patterns calculated for an array according to the invention at 2000 Hz., at which frequency the interelement spacing is about λ/3. FIG. 3*a* illustrates solid-line plot 310 in the horizontal plane, or the Θ=90° plane, in a conventional Φ, Θ spherical coordinate system, with the phase shifters set to direct the beam in the Φ=0°, Θ=90° direction. Plot 310 has a main beam directed to the left toward Φ=0°, with a peak amplitude at 0 dB. A dash-line plot 312 represents a signal or radiated power level which is half-power, or −3 dB relative to the peak amplitude of the main beam. The 3 dB beamwidth of the main beam is determined by the crossings of the two plots, which occur at point 314, corresponding to an angle of about +35°, and at point 316, corresponding to a Φ angle of about 325°; the beamwidth is the difference, which is about 70°. Response plot 310 of FIG. 3*a* also has a single back lobe, extending to the right in the direction Φ=180° to a maximum amplitude of about −13 dB. FIG. 3*b* illustrates a corresponding solid-line "vertical" response plot 320, which illustrates the amplitude response of the array at the same frequency of 2000 Hz., at which the distance between array elements or transducers is λ/3, but in the Φ=0° plane of the spherical coordinate system. The condition under which the plot of FIG. 3*b* is made is the same as that of FIG. 3*a*, in that the beam is steered in the direction Φ=90°, Θ=90°. In FIG. 3*b*, the peak amplitude or magnitude of the main beam, as indicated, is 0 dB; the location of the peak level in the plots is of no significance. Dash-line plot 322 represents a radiated acoustic power level of −3 dB relative to the peak power of the main beam. As in the case of FIG. 3a, the beamwidth can be determined by the crossings of the plots, designated 324 and 326. The 3 dB beamwidth of vertical plot 320 is about 120° minus 60°, or 60°. The back lobe of the vertical radiation pattern of FIG. 3*b* is directed toward 270°, and has an amplitude of about 13 dB below the peak radiation level. Thus, the main beam has approximately equal horizontal and vertical beamwidths of 70° and 60° at 2000 Hz.

Figure 3C:
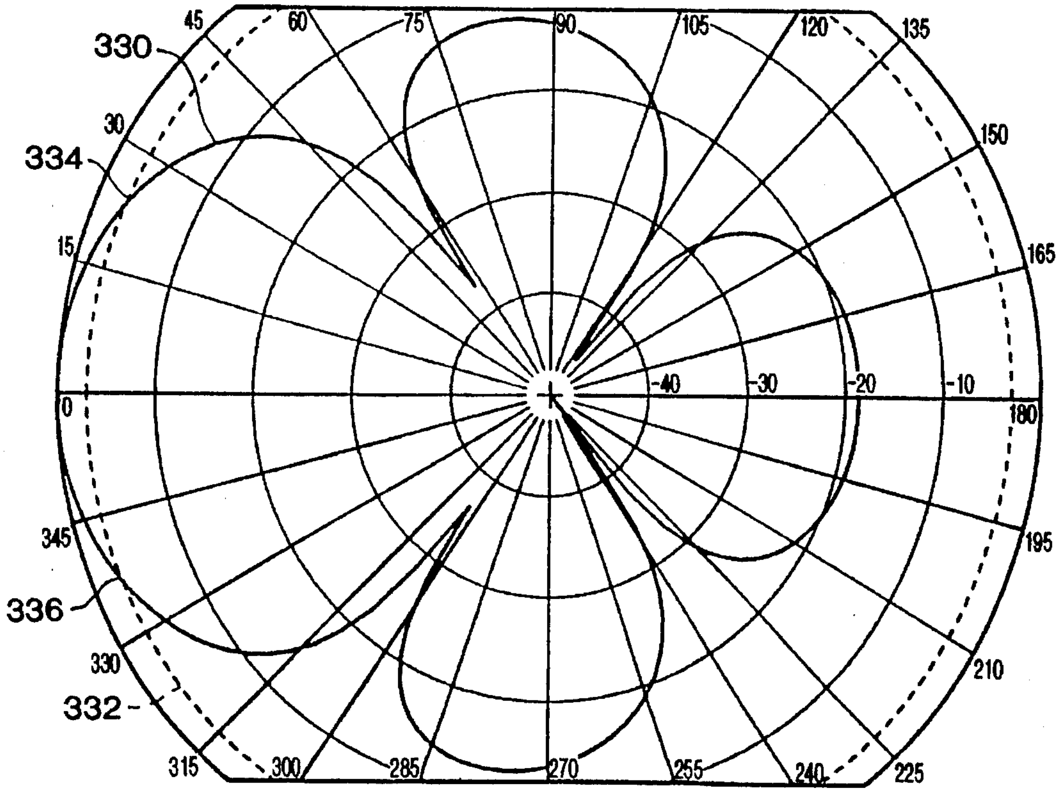
FIGS. 3*c* and 3*d* are horizontal and vertical patterns, respectively, for the array at 3000 Hz.
Figure 3D:
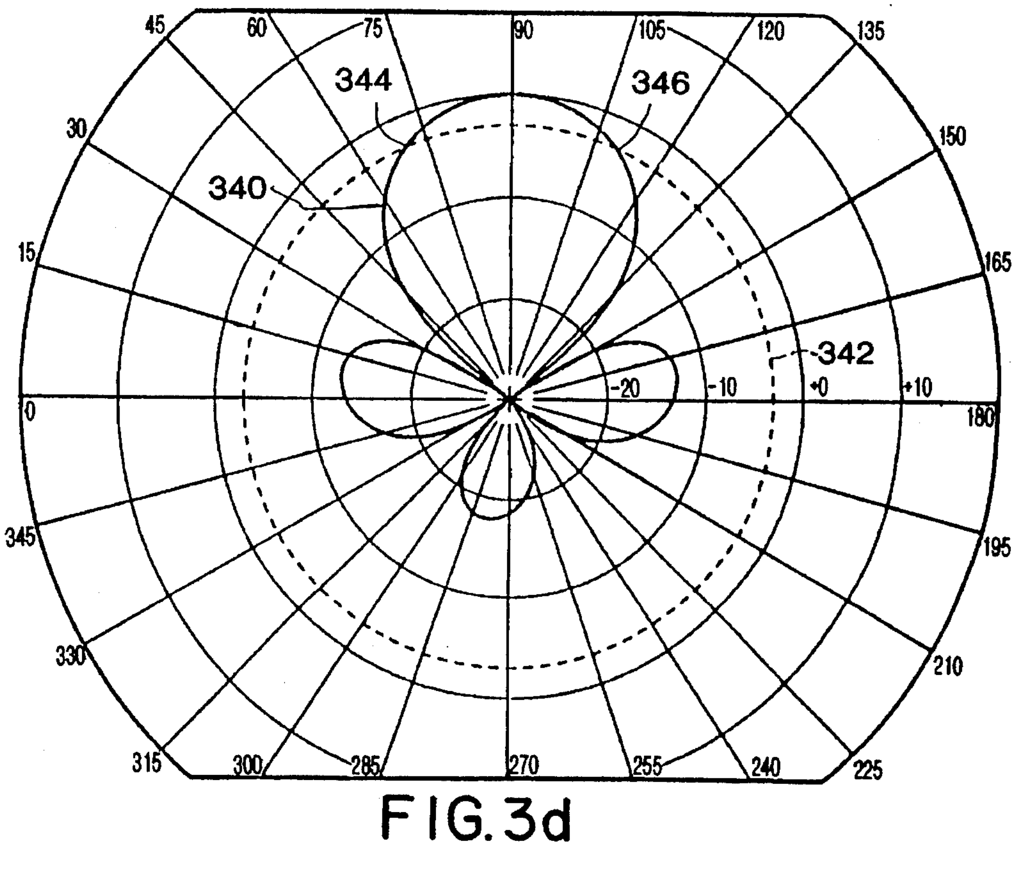

FIGS. 3*c* and 3*d* illustrate solidline horizontal and vertical plots 330 and 340, respectively, which correspond exactly with plots 310 and 320 of FIGS. 3*a* and 3*b*, respectively, except that the frequency of operation is 3000 Hz. rather than 2000 Hz., so that the separation between the array elements, measured in wavelengths, is somewhat larger than λ/3. In FIGS. 3*c* and 3*d*, the −3 dB level, relative to the peak magnitude of the main lobe, is represented by dash-line plots 332 and 342, respectively. The beamwidths are established as in the case of FIGS. 3*a* and 3*b*, namely by the crossings of the plots. In FIG. 3*c*, the crossings are designated 334 and 336, and the −3 dB horizontal beamwidth is about 45°, and in FIG. 3*d*, the crossings are designated 344 and 346; the vertical beamwidth is about 38°. At 3000 Hz., the array response in both the vertical and horizontal planes exhibits two side lobes, and also a back lobe which is more than 15 dB down (below the peak amplitude of the main lobe).

Figure 3E:
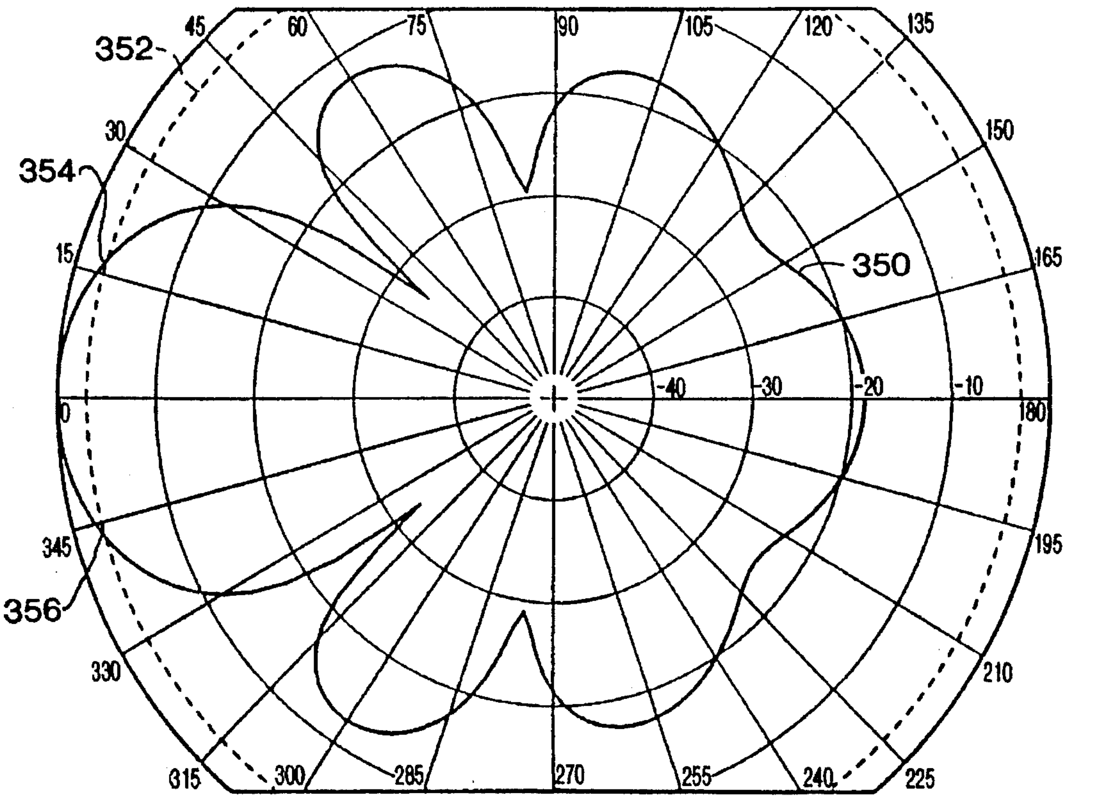
FIGS. 3*e* and 3*f* are horizontal and vertical patterns, respectively, at 4000 Hz.
Figure 3F:
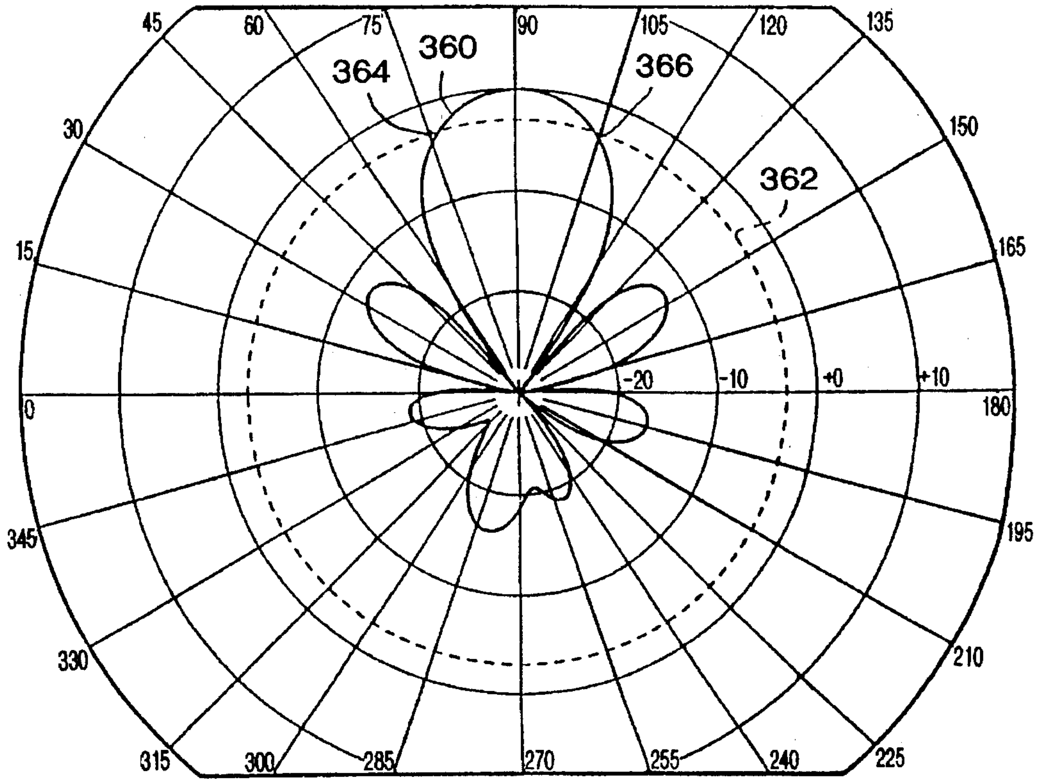

FIGS. 3*e* and 3*f* illustrate plots corresponding to those of FIGS. 3*a* and 3*b*, except at 4000 Hz. In FIG. 3*e*, solid-line response plot 350 exhibits four sidelobes and a back lobe, and has a main lobe with a peak magnitude at 0 dB. From the crossing of the response plot with the −3 dB plot 352 at points 354 and 356, the horizontal beamwidth is about 36°. Remembering that the array is steered to Φ=0°, Θ=90° the solid-line vertical plot 360 has a beamwidth of about 27°, as indicated by the crossing of dash-line −3 dB plot 362 at points 364 and 366.

Figure 3G:
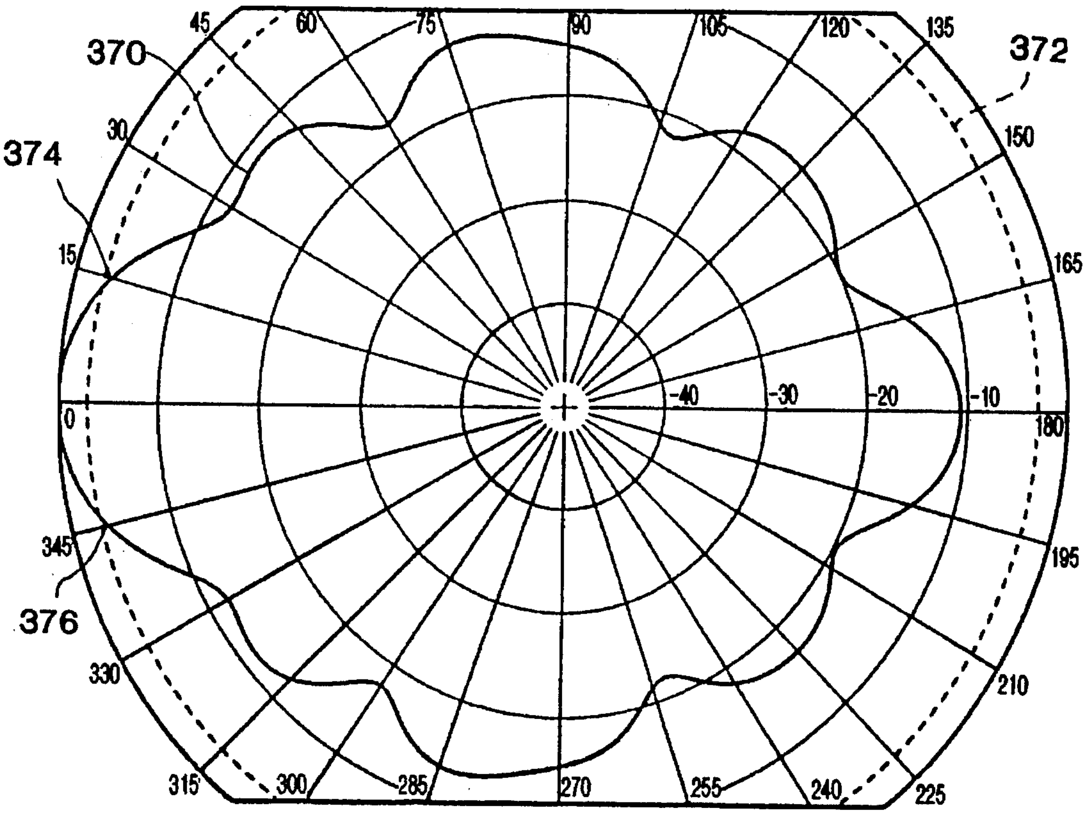
FIGS. 3*g* and 3*h* are at 5000 Hz.
Figure 3H:
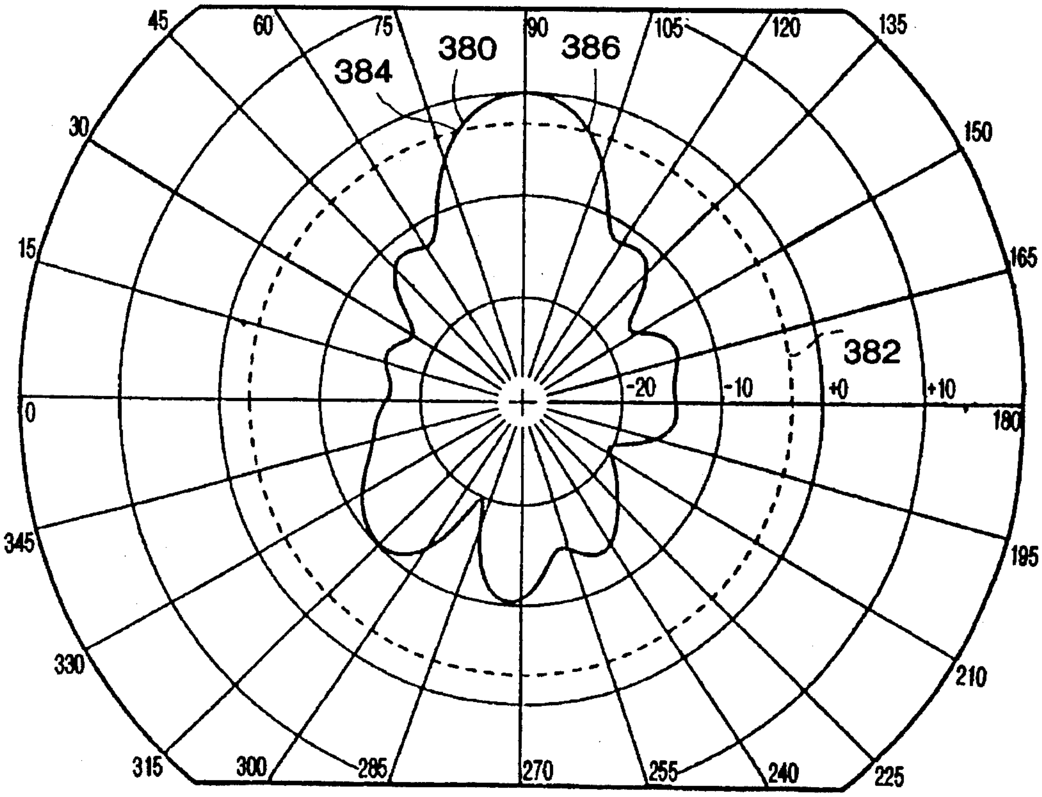

FIGS. 3*g* and 3*h* illustrate plots corresponding to those of FIGS. 3*a* and 3*b*, except at 5000 Hz. In FIG. 3*g*, solid-line response plot 370 exhibits six sidelobes and a back lobe, and has a main lobe with a peak magnitude at 0 dB. From the crossing of the response plot with the −3 dB plot 372 at points 374 and 376, the horizontal beamwidth is about 28°. The solid-line vertical plot 380 has a beamwidth of about 20°, as indicated by the crossing of dash-line −3 dB plot 382 at points 384 and 386.

Figure 3I:
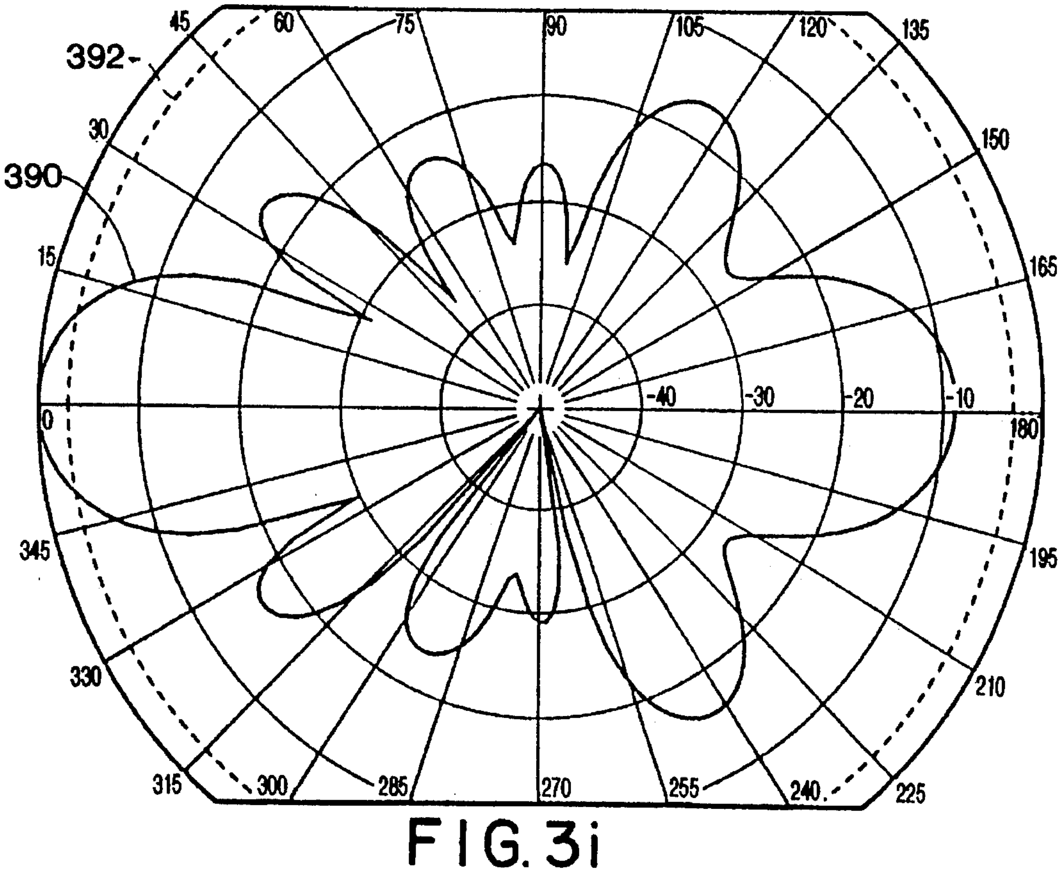
FIGS. 3*i* and 3*j* are at 7000 Hz.
Figure 3J:
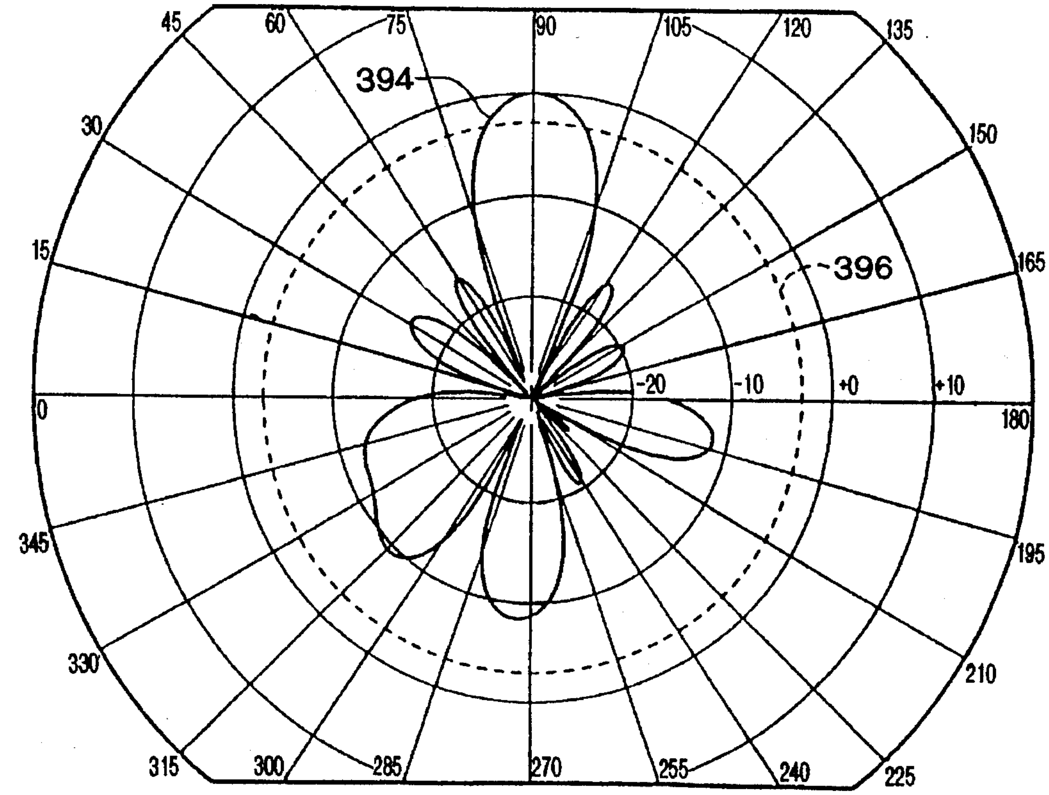

FIGS. 3*i* and 3*j* illustrate plots corresponding to those of FIGS. 3*a* and 3*b*, except that they are made at 7000 Hz. In FIG. 3*i*, solid-line response plot 390 has somewhat irregular sidelobes and a back lobe, and has a main lobe with a peak magnitude at 0 dB. From the crossing of the response plot 390 with the −3 dB plot 392, the horizontal beamwidth is about 20°. The solid-line vertical plot 394 has a beamwidth of about 16°.

The indicated beam widths of about 30° in each plane at frequencies above the lowest frequency correspond to a gain increase of about five dB over a dodecahedral array as described in the Kuhn '166 patent.

Other embodiments of the invention will be apparent to those skilled in the art. For example, the regular geodesic two-frequency icosahedral array may be physically rotated about one or more axes in order to eliminate phase-shifted or delayed-signal steer angles which tend to produce undesirable mutual impedances at nominal steer angles. The icosahedral or dodecahedral arrays described in the above-mentioned Kuhn patent may be nested within the regular geodesic two-frequency icosahedral array. As a further alternative, the regular geodesic two-frequency icosahedral array may be mutually nested with other regular geodesic two-frequency icosahedral arrays having different array dimensions, in order to increase the total available bandwidth. In such an arrangement, each of the nested arrays would have its own receiver and transmitter, as appropriate, for its particular band of operation, or, alternatively, each of the nested arrays could be switched to the single transmitter or receiver, depending upon the current operating frequency of the transmitter or receiver. Naturally, the delays imparted to the drive signals of the various arrays must be adjusted to provide a beam(s) in the desired direction(s).

What is claimed is:

1. A transducer array comprising:

forty-two acoustic transducers for use in a fluid medium, each of said transducers having maximum lateral dimensions of less than one acoustic wavelength in said medium;

arraying means for arraying said acoustic transducers at the vertices of a regular geodesic two-frequency icosahedron, said arraying means further comprising:

one of drive and receiving means coupled to said transducers, for generating transducer drive signals therefor, and for receiving transduced signals therefrom, respectively; and delay control means coupled to said acoustic transducers and with said one of said drive and receiving means, for controlling an acoustic beam formed by said array.

2. An array according to claim 1, wherein said delay control means in conjunction with said one of drive and receiving means controls said transducers at frequencies selected so that the inter-transducer spacing of any two mutually adjacent transducers does not exceed 2λ/3, and is not less than λ/3 .

* * * * *